(12) United States Patent
Eddleman

(10) Patent No.: US 7,342,328 B1
(45) Date of Patent: Mar. 11, 2008

(54) METHODS AND CIRCUITS FOR TRACKING AND SEQUENCING MULTIPLE POWER SUPPLIES

(75) Inventor: Daniel Eddleman, Sunnyvale, CA (US)

(73) Assignee: Linear Technology Corporation, Milpitas, CA (US)

( * ) Notice: Subject to any disclaimer, the term of this patent is extended or adjusted under 35 U.S.C. 154(b) by 394 days.

(21) Appl. No.: 10/761,501

(22) Filed: Jan. 20, 2004

(51) Int. Cl.
*H02J 1/00* (2006.01)
*H02J 3/00* (2006.01)

(52) U.S. Cl. ........................................ 307/80
(58) Field of Classification Search ................... 307/80
See application file for complete search history.

(56) References Cited

U.S. PATENT DOCUMENTS 3,623,140 A * 11/1971 Nercessian ................ 323/268
6,191,569 B1 * 2/2001 Arbetter et al. ............. 323/272

OTHER PUBLICATIONS

Galinski, Martin; "Circuit manages power-up sequencing"; EDN; Oct. 31, 2002.
Linear Technology; "LT1645 Dual-Channel Hot Swap Controller/ Power Sequencer"; Datasheet; 1999.
Linear Technology; "LTC2920-1/LTC2920-2 Single/Dual Power Supply Margining Controller"; Datasheet, Initial Release; Mar. 2003.
Linear Technology; "LTC3205 Multidisplay LED Controller"; Datasheet, Initial Release; Aug. 2003.
Maxim Integrated Products; "MAX5039/MAX5040 Voltage-Tracking Controllers for PowerPC, DSPs, and ASICs"; Datasheet; May 2002.
Summit Microelectronics, Inc.; "SMT4004 Quad Trakking™ Power Supply Manager", Datasheet; Jun. 9, 2003.
Summit Microelectronics, Inc.; "SMT4004 Quad Tracking Power Supply Manager Advanced Current Sensing Schemes and Power MOSFET Selection"; Application Note 20; Feb. 21, 2002.
Summit Microelectronics, Inc.; "SMT4004 Quad Tracking Power Supply Manager Windows GUI Users Guide and Configuration Register Descriptions"; Application Note 22; Aug. 23, 2002.
Summit Microelectronics, Inc.; "SMT4004-Advanced Voltage Tracking Methods Boost Efficiency, Reliability"; Application Note 26, Advance Information; Oct. 16, 2002.
Summit Microelectronics, Inc.; "Xilinx Virtex™-E, Spartan™-IIE FPGA and SMT4004 TRAKKER™ Supply Manager Reference Design: Procedure and Results Summary"; Application Note 31; Jan. 7, 2003.
Summit Microelectronics, Inc.; "Lossless Tracking Procedure and Results Summary Reference Design: Xilinx Virtex™-E, Spartan™-IIE FPGA and SMT4004 TRAKKER™"; Application Note 34; Jan. 7, 2003.

* cited by examiner

*Primary Examiner*—Robert L. Deberadinis
*Assistant Examiner*—Carlos Amaya
(74) *Attorney, Agent, or Firm*—McDermott Will & Emery LLP (57) ABSTRACT

The present invention relates to methods and circuits for controlling outputs of one or more slave power supplies in one or more defined relationships to a master signal. The defined relationships include but are not limited to coincident tracking, offset tracking, ratiometric tracking, and supply sequencing.

19 Claims, 7 Drawing Sheets

METHODS AND CIRCUITS FOR TRACKING AND SEQUENCING MULTIPLE POWER SUPPLIES

FIELD OF THE INVENTION

The present invention relates to methods and circuits for tracking or sequencing multiple power supplies. More specifically, the present invention relates to methods and circuits for controlling outputs of one or more slave power supplies in user-programmable defined relationships to a master signal.

BACKGROUND OF THE INVENTION

Figure 2A:
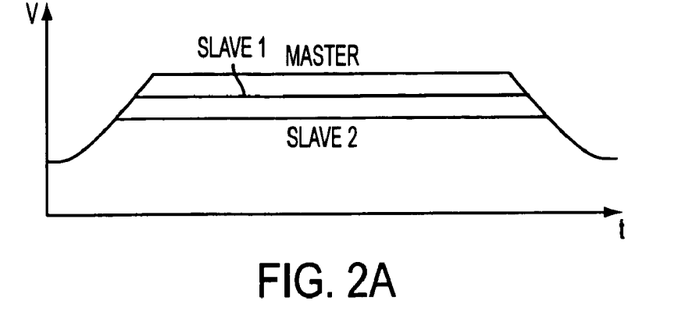
FIGS. 2A-2D are illustrative graphs of various relationships that the tracking or sequencing circuit of the present invention may enforce between a master signal and output voltages of slave supplies.
Figure 2B:
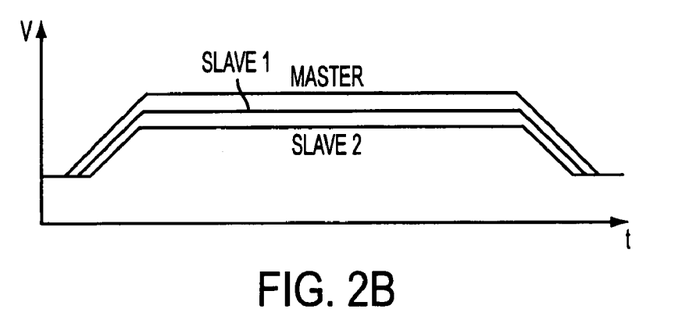
Figure 2C:
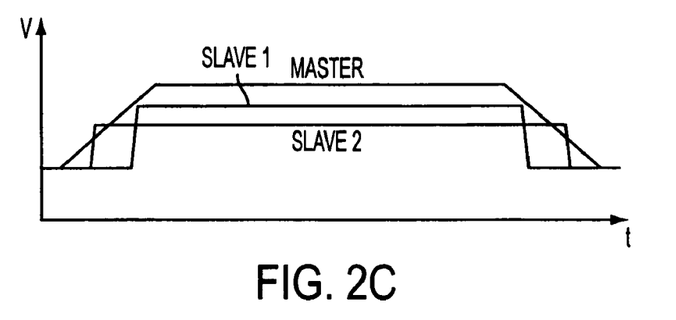

Numerous applications, including but not limited to those using certain microprocessors, digital signal processors, field programmable gate arrays and programmable logic devices, have requirements concerning the relative behavior between multiple power supplies. The applications may require that power supplies ramp up and down together at a specific rate (see, e.g., FIG. 2A). The applications also may require that the supplies ramp up and down with other behaviors, such as in the case of supply sequencing (see, e.g., FIG. 2C).

Figure 1A:
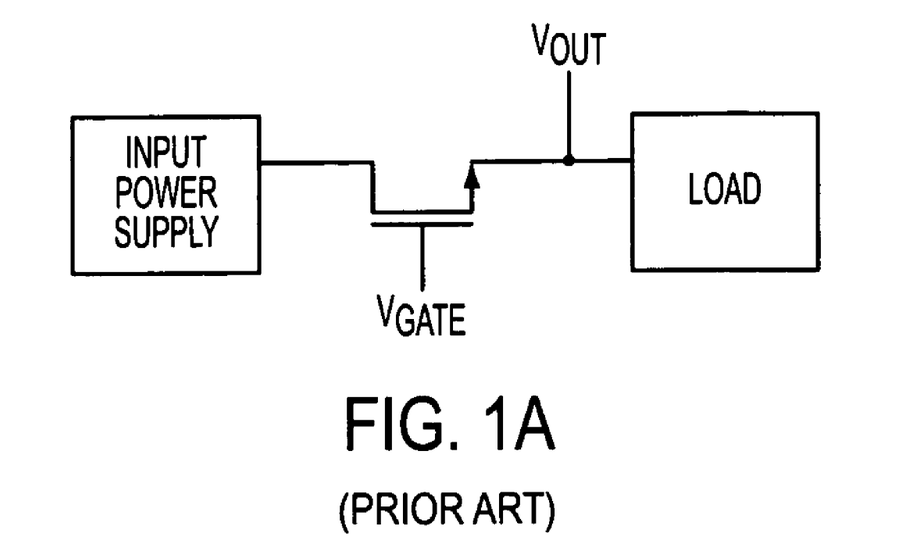
FIG. 1A is a simplified diagram of a series FET employed to control the behavior of an input power supply.
Figure 1B:
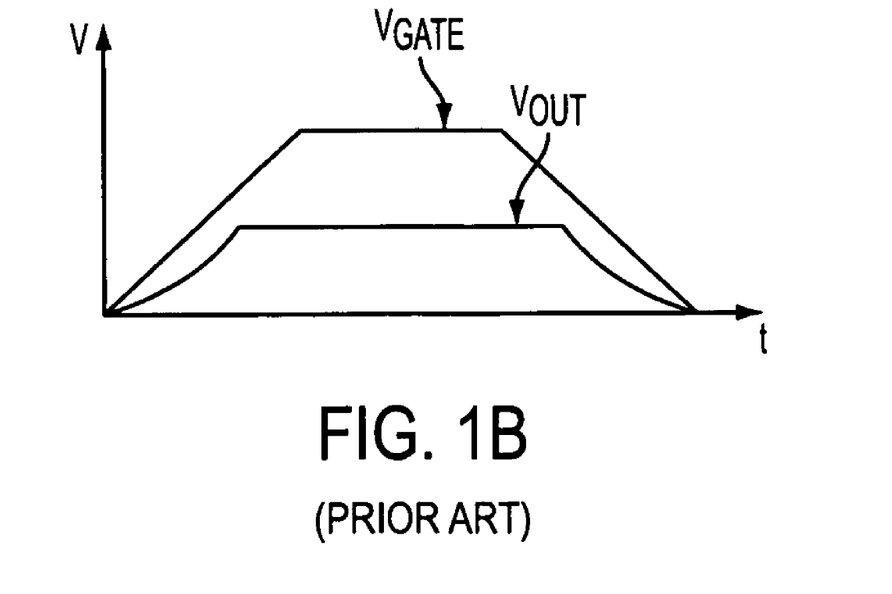
FIG. 1B is an illustrative graph of voltages at the gate and source of the series FET of FIG. 1A.

A common method used to control the behavior of multiple supplies during power up and power down is to use series FETs (field effect transistors). The drain of the FET is connected to the power supply's output, and the gate node voltage of the FET usually is slewed at a predefined rate which sets the ramp up and ramp down rate of the controlled supply (see, e.g., FIGS. 1A-B). This is the method used by a product manufactured and sold by Linear Technology Corporation, the LTC1645, Dual-Channel Hot Swap Controller/Power Sequencer.

One disadvantage of series FETs is that the current flowing through the FET produces a voltage drop that appears between the input power supply (at the drain of the FET) and the voltage at the load (which may be connected to the source of the FET). Additionally, if the requirements of the system are stringent, a feedback loop is necessary to maintain a predefined relationship between multiple supplies due to the mismatch between the FETs. This type of feedback loop is used by a product marketed by Summit Microelectronics, Inc., the SMT4004, Quad Trakking™ Power Supply Manager.

Another method places a shunt FET between two supplies. When the voltage of the lower supply is too low, current flows through the FET from the upper supply and pulls up the lower supply. If the voltage of the lower supply is higher than that of the upper supply, the FET is turned on, shorting the upper and lower supplies.

Power supplies often are capable of sinking current and sometimes regulate to a low voltage as they are powered up. In the shunt FET configuration, this poses serious hazards. If the lower supply is capable of sinking current, it may sink a large amount of current from the upper supply and damage the shunt FET. Similarly, the upper supply may sink current when it falls below the lower supply. When the FET shorts the supplies, it also may overload an input power supply, causing its voltage to collapse, or the large current potentially dumped to ground could cause ground bounce. Furthermore, this method only clamps the two supplies together. It does not allow sequencing or a controlled ramp up and ramp down behavior. This is the method employed by a product marketed by Maxim Integrated Products, the MAX5039/MAX5040, Voltage-Tracking Controllers for PowerPC, DSPs, and ASICs.

In view of the foregoing, it would be desirable to be able to provide methods and circuits for tracking or sequencing multiple power supplies in defined relationships.

It also would be desirable to be able to provide methods and circuits for tracking or sequencing multiple power supplies in defined relationships that are user-programmable.

It further would be desirable to be able to provide methods and circuits for tracking or sequencing multiple power supplies that present a high impedance to one or more of the power supplies.

SUMMARY OF THE INVENTION

In view of the foregoing, it is an object of the present invention to provide methods and circuits for tracking or sequencing multiple power supplies in defined relationships.

It is also an object of the present invention to provide methods and circuits for tracking or sequencing multiple power supplies in defined relationships that are user-programmable.

It further is an object of the present invention to provide methods and circuits for tracking or sequencing multiple power supplies that present a high impedance to one or more of the power supplies.

These and other objects of the present invention are accomplished by a tracking or sequencing circuit that may be user-programmed to control multiple power supplies in defined relationships. The tracking or sequencing circuit generates current in accordance with a defined relationship to a master signal, e.g., a signal generated from a master power supply, and injects the generated current into each feedback node of the slave supplies. Because the tracking or sequencing circuit is configured as a current source, it presents a high impedance to the feedback nodes of the power supplies. In one embodiment, a user may define the tracking or sequencing relationship between the master signal and an output of a slave supply by selection of appropriate resistances.

BRIEF DESCRIPTION OF THE DRAWINGS

Further features of the present invention, its nature and various advantages will be more apparent from the accompanying drawings and the following detailed description, in which.

DETAILED DESCRIPTION OF THE INVENTION

Figure 2D:
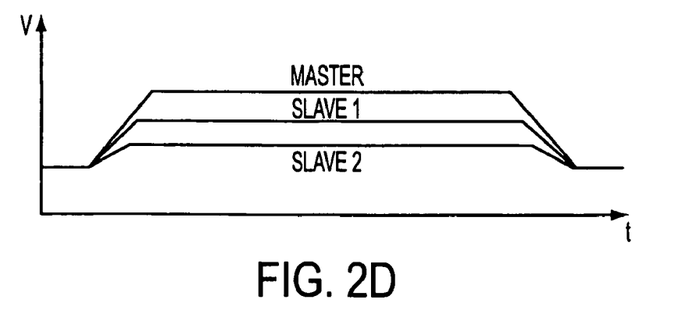
Figure 3:
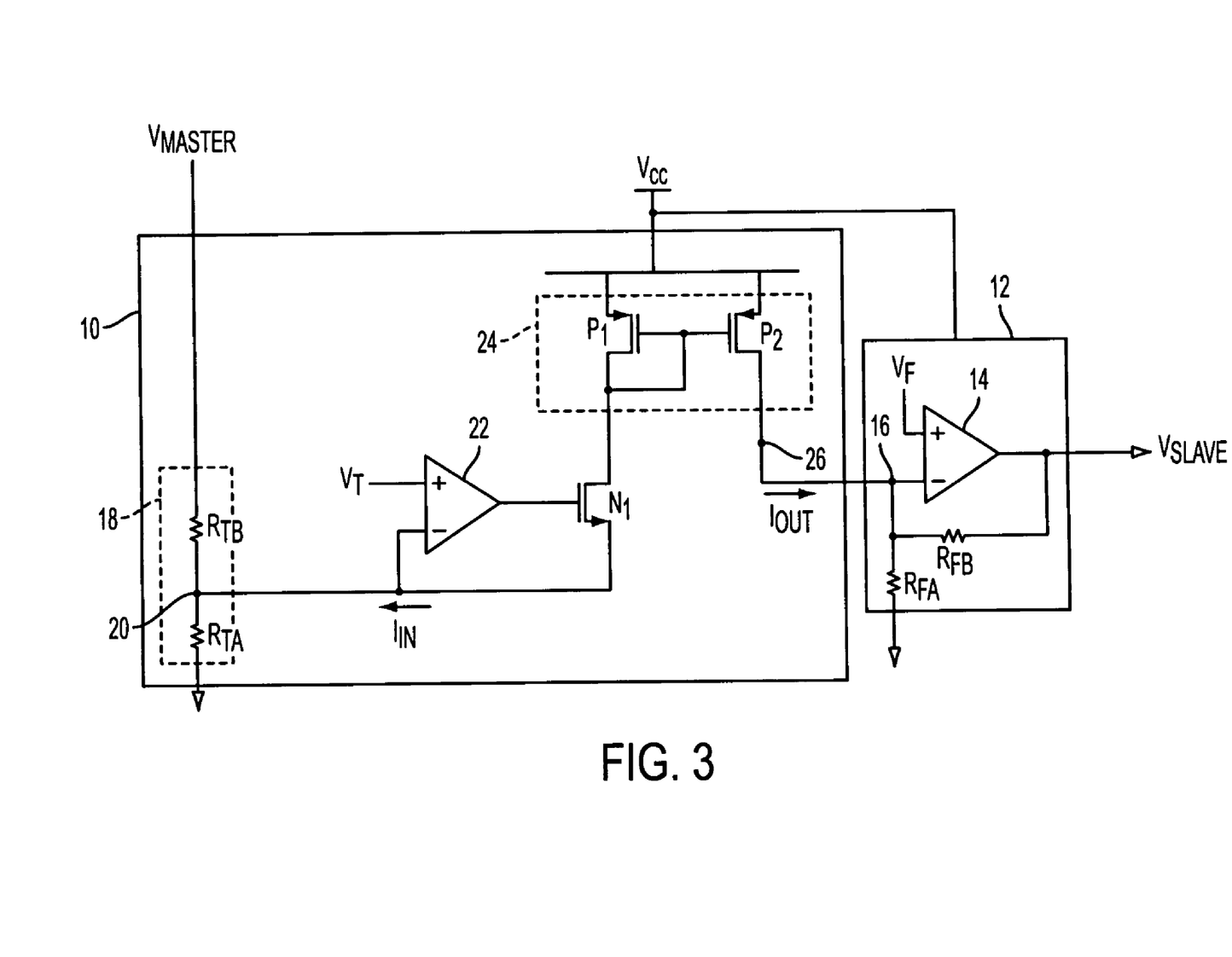
FIG. 3 is a schematic of a first embodiment of the present invention for tracking or sequencing master and slave signals.

Numerous applications have requirements concerning the relative behavior between multiple power supplies. The applications may require that the supplies ramp up and ramp down together in defined relationships, including, but not limited to, coincident tracking at a specific rate (see FIG. 2A), with fixed voltage offsets (see FIG. 2B), in a particular sequence (see FIG. 2C) or ratiometrically (see FIG. 2D). FIG. 3 illustrates a first embodiment of a tracking or sequencing circuit of the present invention that controls the output voltage of a slave supply in such defined relationships to a master signal. One of ordinary skill in the art will recognize that the term "an output voltage" does not necessarily mean that the voltage at the output of the power converter is a constant value. Rather, as is understood in the art, the power converter's output voltage may vary to some extent.

Circuit 10 controls the behavior of slave output $V_{SLAVE}$ responsive to master signal $V_{MASTER}$, e.g., a signal generated from a master power supply (not shown). Slave supply 12 may be any power supply that may be modeled as amplifier 14 that accepts a reference voltage $V_F$ and a feedback network having two feedback resistors $R_{FA}$ and $R_{FB}$ connected to feedback node 16 of amplifier 14. Circuit 10 generates current responsive to master signal $V_{MASTER}$ and injects that current into feedback node 16 of slave supply 12 to control output voltage $V_{SLAVE}$ of the slave supply.

Circuit 10 comprises voltage divider 18, having resistors $R_{TA}$ and $R_{TB}$, that divides master signal $V_{MASTER}$ and establishes divided master signal $V_{DIV}$ at node 20, which is the tracking input terminal. Node 20 is interposed between resistors $R_{TA}$ and $R_{TB}$ and is connected to the source of transistor N1 and the inverting input of high gain op amp 22. Op amp 22 also has a non-inverting input fixed at reference voltage $V_T$ and an output that drives the gate of transistor N1 to turn transistor N1 on to conduct current therethrough. A feedback loop is established about op amp 22 to servo the inverting input (and thus node 20) of op amp 22 at reference voltage $V_T$.

The drain of transistor N1 is coupled to the input of current mirror 24, which operates to provide as much input current $I_{IN}$ as needed to maintain node 20 at reference voltage $V_T$. If master signal $V_{MASTER}$ forces the voltage at node 20 to be less than reference voltage $V_T$, op amp 22 and transistor N1 causes current mirror circuit 24 to supply as much input current $I_{IN}$ as necessary to raise the voltage at node 20 to reference voltage $V_T$. If master signal $V_{MASTER}$ forces the voltage at node 20 to be greater than reference voltage $V_T$, no current is provided by current mirror 24 since transistor N1 cannot sink current which is necessary to pull node 20 down to reference voltage $V_T$. Current mirror 24 may comprise any current mirror, including, but not limited to, the basic current mirror shown in FIG. 3, a cascode current mirror, a Wilson current mirror or a modified Wilson current mirror. In one embodiment, current mirror 24 comprises a current mirror configured to mirror a range of input current, e.g., the current mirrors described in co-pending U.S. Pat. No. 6,897,717 to Eddleman et al., issued on May 24, 2005, entitled "METHODS AND CIRCUITS FOR MORE ACCURATELY MIRRORING CURRENT OVER A WIDE RANGE OF INPUT CURRENT," which herein is incorporated in its entirety. In the following discussion, it is assumed that current mirror 24 generates output current $I_{OUT}$ that approximately is equal to input current $I_{IN}$, taking into account the finite voltage drop across transistor N1. However, the ratio of input current to output current ($I_{IN}/I_{OUT}$) can be different without departing from the scope of the present invention.

Output current $I_{OUT}$ produced by current mirror 24 is delivered to output node 26, which is coupled to feedback node 16 of slave supply 12. For given values of feedback resistors $R_{FA}$ and $R_{FB}$ of slave supply 12, the values of resistors $R_{TA}$ and $R_{TB}$ establish the defined relationship between output voltage $V_{SLAVE}$ of power supply 12 and master signal $V_{MASTER}$. In one embodiment of the present invention, resistors $R_{TA}$ and $R_{TB}$ are user-programmable to permit a user to define the relationship desired between master signal $V_{MASTER}$ and slave output $V_{SLAVE}$. As used herein, the term "user-programmable" refers to the capability of varying parameters of the circuit with external components.

The following detailed discussion of circuit 10 focuses on control of slave supply 12 to coincidentally track master signal $V_{MASTER}$. For illustrative purposes only, it is assumed that reference voltage $V_T$ is selected to be equal to reference voltage $V_F$. However, reference voltage $V_T$ may be selected to be a voltage different than reference voltage $V_F$ without departing from the scope of the invention, as is discussed in further detail hereinbelow.

To ramp up and ramp down output voltage $V_{SLAVE}$ of the slave supply coincident with master signal $V_{MASTER}$, resistors $R_{TA}$ and $R_{TB}$ are selected to be equal in resistance to feedback resistors $R_{FA}$ and $R_{FB}$ (respectively) if reference voltages $V_T$ and $V_F$ are equal. When master signal $V_{MASTER}$ is at 0V, and thus the voltage at node 20 also would have been equal to 0V absent op amp 22, op amp 22 servos node 20 at reference voltage $V_T$ by driving the gate of transistor N1 which buffers current from its source to its drain. Current mirror 24 provides maximum input current $I_{IN,MAX}$ through node 20 to raise the voltage at node 20 to reference voltage $V_T$. Current mirror 24 then generates maximum output current $I_{OUT,MAX}$ that is equal in magnitude to maximum current $I_{IN,MAX}$ at output node 26 and feedback node 16 of slave supply 12 (assuming that transistor P2 still is operating properly in the saturation region). Since the voltage at which amplifier 14 servos feedback node 16 is equal to reference voltage $V_T$, current mirror 24 generates enough output current so that input current $I_{IN}$ and output current $I_{OUT}$ approximately are equal in magnitude, and resistances of feedback resistors $R_{FA}$ and $R_{FB}$ are equal to that of resistors $R_{TA}$ and $R_{TB}$ (respectively), output current $I_{OUT}$ sourced by current mirror 24 is distributed through resistors $R_{FA}$ and $R_{FB}$ so that the current flowing across resistor $R_{FA}$ is equal to the current flowing across resistor $R_{TA}$ and the current flowing across resistor $R_{FB}$ is equal to the current flowing across resistor $R_{TB}$. This forces output voltage $V_{SLAVE}$ of slave supply 12 approximately to be equivalent to master signal $V_{MASTER}$.

As master signal $V_{MASTER}$ increases, current mirror 24 is required to provide less input current $I_{IN}$ to servo node 20 at reference voltage $V_T$. An equivalent decrease in output current $I_{OUT}$ is generated by current mirror 24 to increase slave output $V_{SLAVE}$. When master signal $V_{MASTER}$ rises to a level that, when divided by voltage divider 18, establishes the voltage at node 20 to be equal to reference voltage $V_T$, current mirror 24 does not need to provide any input current $I_{IN}$. Accordingly, no output current $I_{OUT}$ is generated by current mirror 24 and injected into feedback node 16 of slave supply 12. Since circuit 10 acts as a current source, the circuit presents a high impedance at feedback node 16 of the slave supply 12, permitting the slave supply to regulate output voltage $V_{SLAVE}$ without being affected by circuit 10 and master signal $V_{MASTER}$. This effectively disconnects circuit 10 from slave supply 12 and thus device 10 has no effect on the output voltage accuracy, transient response or stability of the slave supply.

As master supply $V_{MASTER}$ continues to increase, slave supply 12 continues to regulate its output voltage $V_{SLAVE}$ independently of master signal $V_{MASTER}$. Circuit 10 resumes control of output voltage $V_{SLAVE}$ of slave supply 12 responsive to master signal $V_{MASTER}$ once master signal $V_{MASTER}$ has reduced to a value that, when divided by voltage divider 18, would force the voltage at node 20 below reference voltage $V_T$ if op amp 22, transistor N1, and current mirror 24 were not present. While FIGS. 2A-2D illustrate that this occurs during ramp down, for example, circuit 10 may resume control of output voltage $V_{SLAVE}$ responsive to the master signal at any time the voltage at node 20 falls below reference voltage $V_T$.

Advantageously, because the magnitude of output current $I_{OUT}$ that is injected into feedback node 16 is controlled in an open loop manner, tracking or sequencing circuit 10 has little or no effect on the transient response or stability of slave supply 12.

To program circuit 10 so that output $V_{SLAVE}$ of slave supply 12 is controlled in a defined relationship to master signal $V_{MASTER}$, a user makes a calculated or empirical selection of appropriate values for the resistances of resistors $R_{TA}$ and $R_{TB}$ of voltage divider 18. In particular, resistor $R_{TB}$ may be selected based on the following equation:

$$R_{TB} = R_{FB} \frac{S_M}{S_S} \qquad \text{EQ. 1}$$

where $S_M$ is the ramp rate of master signal $V_{MASTER}$ and $S_S$ is the desired ramp rate of slave output $V_{SLAVE}$. If the slave supply ramps up coincident with the master signal or with a fixed voltage offset, then the ramp rates of the slave and master signals are equal. When selecting an appropriate ramp rate for the slave supply, the ramp rate of the slave supply should be fast enough so that the slave supply finishes ramping before the master signal has reached its maximum signal value. If not, the slave supply will be held below its intended regulation value by the master signal.

Resistor $R_{TA}$ may be selected based on the following equation if no delay is required between the onset of ramping of the master signal and the onset of ramping of the slave output:

$$R'_{TA} = \frac{V_T}{\frac{V_F}{R_{FB}} + \frac{V_F}{R_{FA}} - \frac{V_T}{R_{TB}}}. \qquad \text{EQ. 2}$$

If no delay is required, such as in coincident or ratiometric tracking, resistor $R_{TA}$ may be selected to be equal to $R'_{TA}$. If a delay is desired, as in offset tracking or supply sequencing, resistor $R_{TA}$ may be selected based on the following equations:

$$R''_{TA} = \frac{V_T \cdot R_{TB}}{t_D \cdot S_M} \qquad \text{EQ. 3}$$

$$R_{TA} = R'_{TA} \| R''_{TA} \qquad \text{EQ. 4}$$

where $t_D$ is the desired delay and EQ. 4 calculates the effective parallel resistance of $R'_{TA}$ and $R''_{TA}$. Small delays and/or large ratios of slave ramp rate to master signal ramp rate may result in negative values for $R_{TA}$. In such cases, either the delay must be increased or the ratio of slave ramp rate to master ramp rate must be reduced. The slave output $V_{SLAVE}$ may be controlled in any defined relationship to master signal $V_{MASTER}$ that can be programmed using the above-described equations.

To control additional slave supplies in defined, user-programmable relationships to master signal $V_{MASTER}$, additional tracking or sequencing circuits 10 may be coupled between the master signal and the additional slave supplies.

Figure 4:
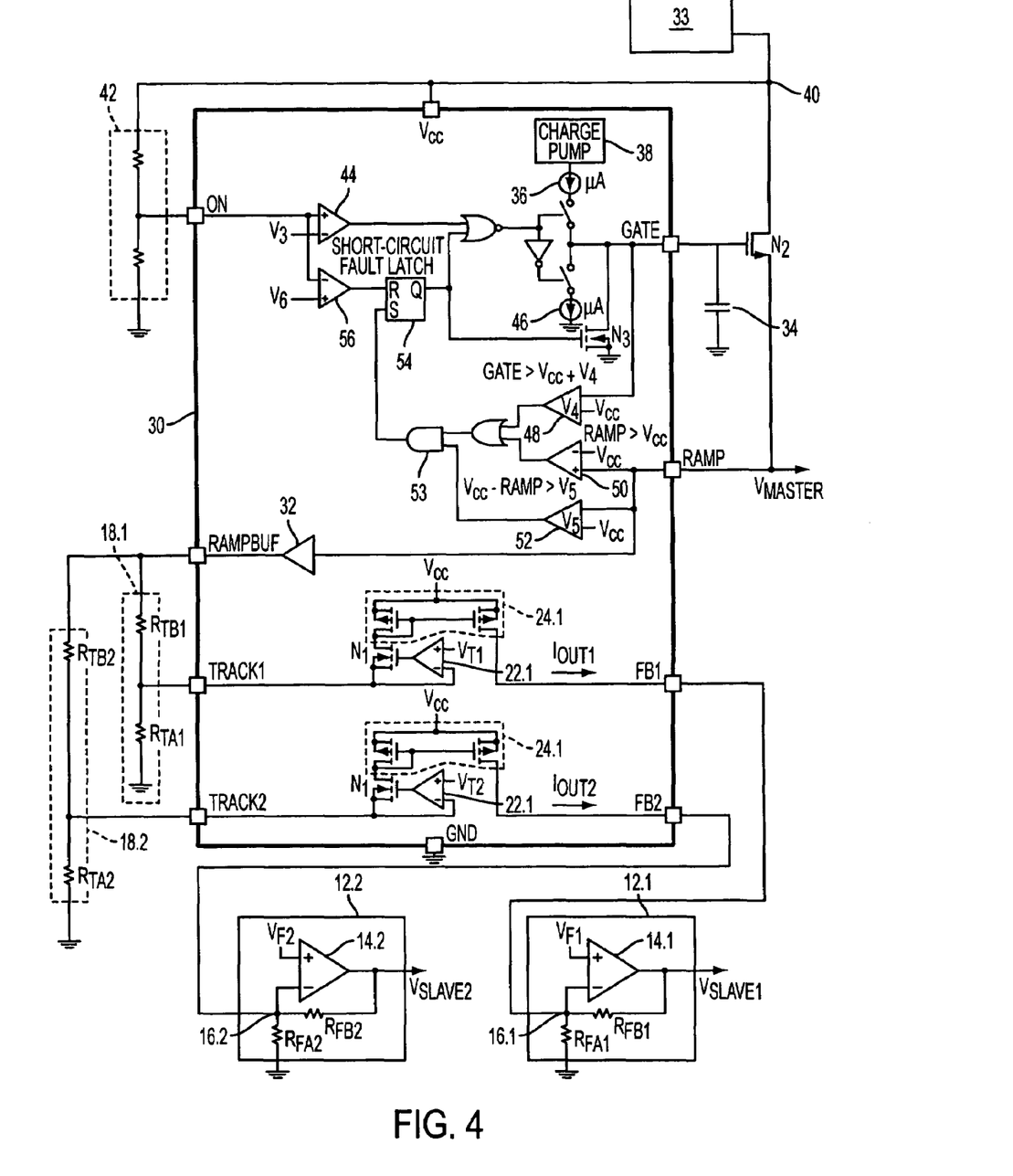
FIG. 4 is a block diagram of the tracking or sequencing circuit of FIG. 3 implemented in a tracking or sequencing device that generates a master signal.

Referring now to FIG. 4, tracking or sequencing device 30 is described, wherein the tracking device is configured to track or sequence multiple slaves supplies to master signal $V_{MASTER}$. In the embodiment of FIG. 4, device 30 is configured to track two slave supplies 12.1 and 12.2. For each slave supply to be controlled in a user-programmable, defined relationship to master signal $V_{MASTER}$, device 30 incorporates one set of op amp 22, current mirror 24, and transistor N1. The source of each transistor N1 and the inverting input of each op amp 22 are coupled to a TRACK pin, which is a tracking input terminal. Each TRACK pin is the equivalent of node 20 of FIG. 3 and is interposed between resistors $R_{TA}$ and $R_{TB}$ of each voltage divider 18. Each voltage divider is coupled between ground and a RAMPBUF pin. Master signal $V_{MASTER}$ is buffered from a RAMP pin to the RAMPBUF pin by, e.g., low impedance 1× buffer 32. Advantageously, buffer 32 prevents the source of FET N2 from pulling up to reference voltage $V_T$ when the FET is off.

In addition to controlling the outputs of slave supplies 12.1 and 12.2 responsive to master signal $V_{MASTER}$, tracking or sequencing device 30 also is configured to generate master signal $V_{MASTER}$. The master signal can be generated from master power supply 33 that is ramped up and ramped down through external series FET N2 with a ramp rate set by user-programmable capacitor 34. Capacitor 34 is tied between the gate of series FET N2 and ground and is driven by current source 36 from charge pump 38. Charge pump 38 is configured to guarantee that the gate of transistor N2 is pulled up to a level that ensures transistor N2 becomes fully enhanced.

To program the ramp rate of master signal $V_{MASTER}$, a user makes a calculated or empirical selection of an appropriate capacitance value. In particular, capacitor 34 may be selected based on the following equation:

$$C_{34} = \frac{I_{GATE}}{S_M} \qquad \text{EQ. 5}$$

where $I_{GATE}$ is the magnitude of the current sourced by current source 36 and $S_M$ is the desired ramp rate of master signal $V_{MASTER}$.

When master supply 33 turns on, it outputs a signal to node 40 that is fed to a $V_{CC}$ pin of device 30 and that sets the voltage at the drain of series FET N2. Voltage divider 42 reduces the voltage at node 40 for comparison by hysteretic comparator 44. Hysteretic comparator 44 accepts the divided voltage signal from an ON pin coupled to voltage divider 42 and outputs a signal LOW when the voltage at the ON pin is less than reference voltage $V_3$. This ensures that master signal $V_{MASTER}$ ramps up only after the signal from master supply 33 has reached a certain voltage. When the output of comparator 44 is LOW, the output of the GATE pin is pulled to ground by current sink 46. Since the GATE pin is tied to the gate of series FET N2, no current is permitted to flow through FET N2 when the GATE pin is pulled to ground, and the voltage at the source of series FET N2 (i.e., master signal $V_{MASTER}$) remains at ground.

When the voltage at the ON pin rises above reference voltage $V_3$, hysteretic comparator 44 outputs a signal HIGH. This activates current source 36 to charge capacitor 34, which ramps up the voltage at the gate of series FET N2, thereby ramping up master signal $V_{MASTER}$. Output currents $I_{OUT1}$ and $I_{OUT2}$ are generated responsive to master signal $V_{MASTER}$ and delivered to feedback nodes 16.1 and 16.2 through FB1 and FB2 pins, respectively. Each output voltage $V_{SLAVE1}$ or $V_{SLAVE2}$ of slave supplies 12.1 and 12.2 (respectively) are ramped up in a user-programmed, defined relationship to master signal $V_{MASTER}$ in a manner similar to that described above with respect to FIG. 3. To prevent damage to slave supplies 12.1 and 12.2, each of the FB1 and FB2 pins may be coupled to a clamp that prevents the FB1 and FB2 pins from forcing the slave's feedback nodes above a certain voltage that is high enough to activate the slave's overvoltage protection circuit and low enough not to damage the pins. Furthermore, the FB1 and FB2 pins are configured to prevent current sink therefrom even when device 30 is unpowered.

When the ON pin falls below a voltage value that is equal to reference voltage $V_3$ minus the incremental hysteresis voltage of hysteretic comparator 44, current sink 46 pulls the GATE pin to ground. This discharges capacitor 34, thereby ramping down master signal $V_{MASTER}$ at the same rate as it ramped up. Thereafter, each output voltage $V_{SLAVE1}$ or $V_{SLAVE2}$ ramps down in the same user-programmed, defined relationship to master signal $V_{MASTER}$ as it had when it ramped up (see, e.g., FIGS. 2A-2D).

Rather than generating master signal $V_{MASTER}$ with master supply 33, the master signal alternatively can be generated by tying both the GATE and RAMP pins to user-programmable capacitor 34. In that case, series FET N2 is eliminated and device 30 may be configured to provide current in excess of that supplied by current source 36 to ensure that adequate current is driven through voltage dividers 18.1 and 18.2. Master supply 33 can still be employed to supply signal to the $V_{CC}$ and ON pins, or the ON pin can be controlled by a digital I/O pin.

In accordance with another aspect of the present invention, device 30 provides an electronic circuit breaker function that protects transistor N2 against short circuits. If series FET N2 is employed, the circuit breaker function is enabled when comparator 48 determines that FET N2 is fully enhanced. More specifically, comparator 48 outputs a signal HIGH when the voltage at the GATE pin (and thus the voltage at the gate of FET N2) is greater than input voltage Vcc, which may be supplied by master supply 33, plus reference voltage $V_4$. Reference voltage $V_4$ is selected to be a value that is greater than or equal to the voltage at which FET N2 turns on fully.

If the current breaker function is enabled and comparator 52 determines that the difference between supply voltage Vcc and the voltage at the RAMP pin (i.e., the voltage across FET N2 when FET N2 is employed) exceeds reference voltage $V_5$ for more than a predetermined length of time, AND gate 53 sets short circuit fault latch 54, which outputs a signal HIGH that drives the gate of transistor $N_3$, rapidly discharging capacitor 34 and thereby turning off FET N2 by pulling the gate of FET N2 down. As a result, master signal $V_{MASTER}$ is pulled low. Because slave supplies 12.1 and 12.2 track master signal $V_{MASTER}$ at the RAMP pin, output voltages $V_{SLAVE1}$ and $V_{SLAVE2}$ also are pulled low. Following a short circuit fault, FET N2 is latched off until comparator 56 determines that the ON pin has pulled below reference voltage $V_6$. At that point, comparator 56 resets fault latch 54. One embodiment of a timing circuit is discussed hereinbelow with respect to FIG. 5A.

Figure 5A:
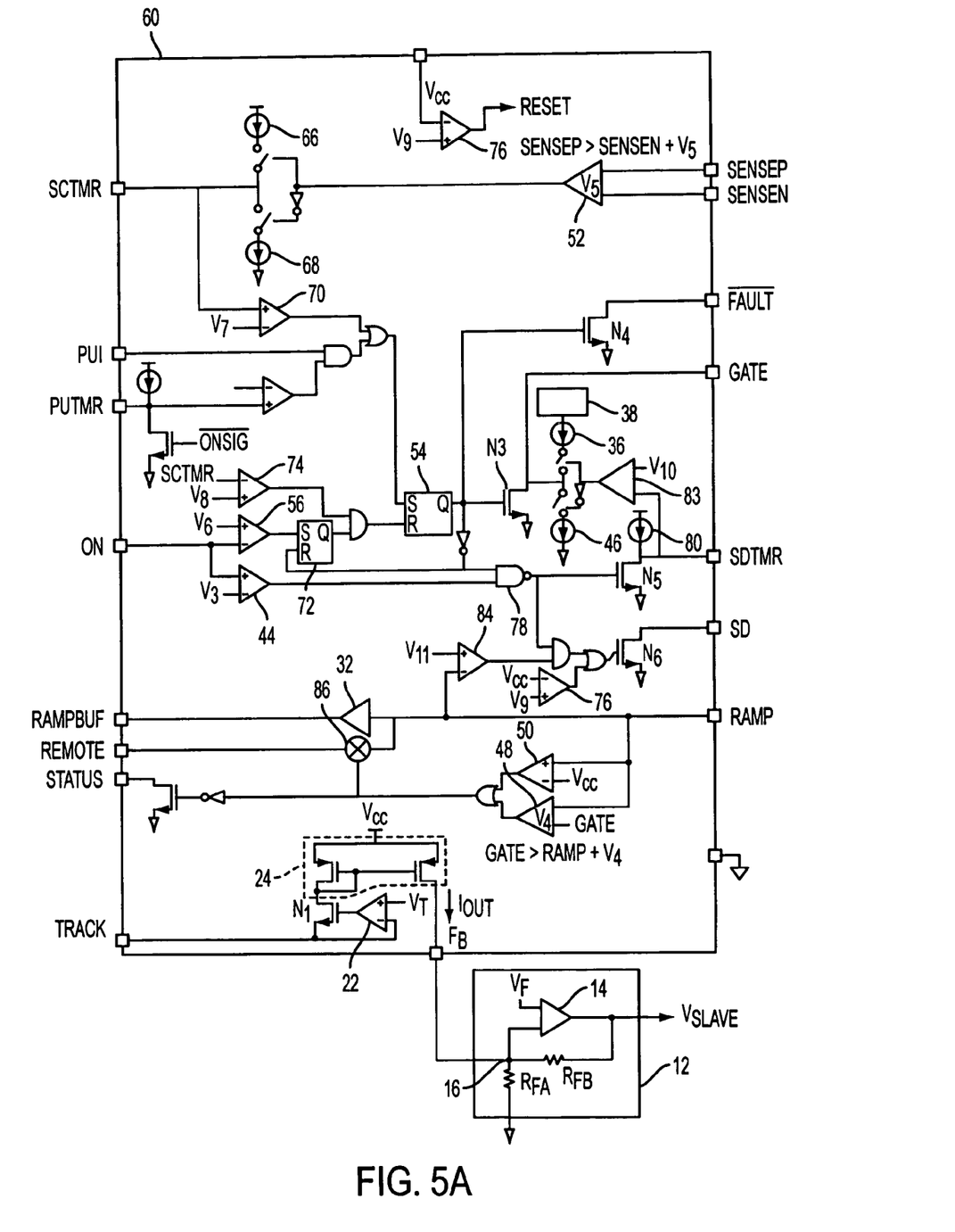
FIGS. 5A-5C is a block diagram of the tracking or sequencing device of FIG. 4 incorporating additional features.
Figure 5B:
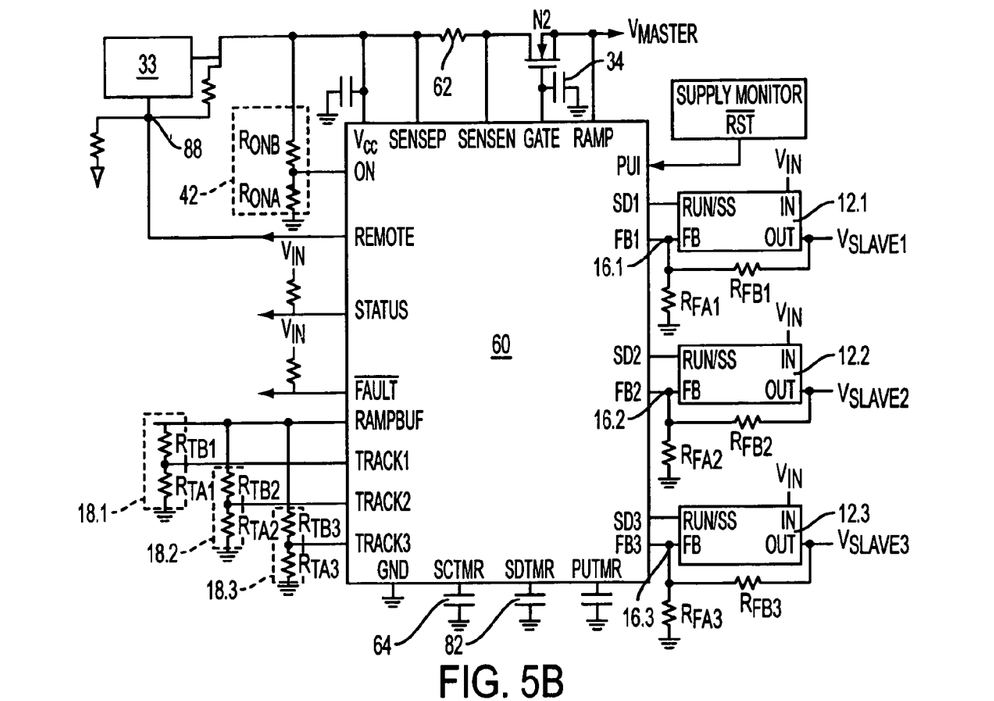
Figure 5C:
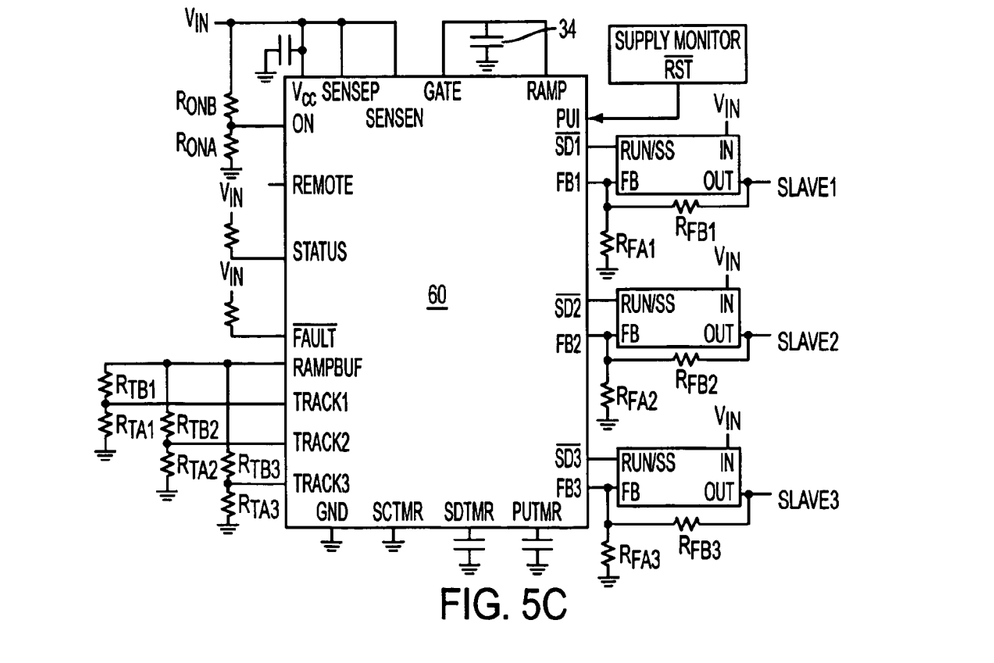

Referring now to FIGS. 5A-5C, an alternative embodiment of tracking or sequencing device 30 is described. In a manner similar to that described above with respect to FIGS. 3 and 4, tracking or sequencing device 60 also is configured to generate master signal $V_{MASTER}$ and control one or more slave supplies 12 in a user-programmable, defined relationship to master signal $V_{MASTER}$. In addition to or in replacement of the features described with respect to device 30, tracking or sequencing device 60 incorporates a different short circuit detection circuit and additional features, including, but not limited to, shutdown outputs, a status output, and a fault output.

To protect series FET N2 from short circuits, tracking or sequencing circuit 60 monitors the voltage across sense resistor 62, which in the embodiment of illustrated in FIG. 5B, is connected in series between the drain of series FET N2 and supply voltage Vcc. If comparator 52 determines that the voltage across resistor 62 is greater than reference voltage $V_5$ for more than a short circuit timer cycle, the gate of FET N2 is pulled low by transistor N3.

The short circuit timer duration is configured by user-programmable short circuit timing capacitor 64 disposed between ground and the SCTMR pin. When comparator 52 determines that the voltage across resistor 62 is greater than reference voltage $V_5$ and trips, timing capacitor 64 is charged by current source 66. Otherwise, when comparator 52 outputs a signal LOW, timing capacitor 64 is discharged to ground by current sink 68. When timing capacitor 64 has charged sufficiently so that the voltage at the SCTMR pin exceeds reference voltage $V_7$, comparator 70 trips and sets short circuit fault latch 54, which then drives the gate of transistor N3. Transistor N3 then pulls the gate of FET N2 to ground and turns it off, thereby pulling master signal $V_{MASTER}$ to 0V. Because slave supply 12 tracks the master signal which is driven by FET N2, slave output $V_{SLAVE}$ also is pulled to ground by the tracking circuit when a short circuit fault occurs.

When fault latch 54 sets, a signal HIGH also is supplied to the gate of transistor N4, which subsequently turns on, pulling the signal at the FAULT pin to ground. If the FAULT pin is connected to the ON pin, device 60 automatically and continuously attempts to ramp up slave output $V_{SLAVE}$ after a fault condition occurs until the fault condition is removed.

Following a short circuit fault, FET N2 is latched off and the FAULT pin is kept low until (1) comparator 74 has determined that current sink 68 has discharged timing capacitor 64 enough so that the voltage at the SCTMR pin has been pulled below reference voltage $V_8$, thereby ensuring that capacitor 64 is discharged before restarting, and (2) comparator 56 has determined that the voltage at ON pin has been pulled below reference voltage $V_6$, setting latch 72. The latter condition ensures that the fault will not be cleared if the supply drops when overloaded by the short circuit.

In some applications, it may be necessary to control the shutdown or soft-start pins of the slave supplies since device 60 may not be able to supply sufficient current from the FB pin when supply voltage $V_{CC}$ is below a certain voltage level. If the slave power supplies are capable of operating at low input voltages, the SD pin may be used to hold the shutdown or soft-start RUN/SS pin of a slave supply LOW until comparator 44 determines that the voltage at the ON pin exceeds reference voltage $V_3$, assuming latch 54 has not latched any faults due to, e.g., short circuit conditions, and comparator 76 has determined that supply voltage $V_{CC}$ is greater than reference voltage $V_9$. At that time, the SD pin switches to a high impedance and NAND gate 78 turns off transistor N5, thereby permitting current source 80 to charge shutdown timing capacitor 82 coupled between the drain of transistor N5 and ground. Before comparator 83 determines that the voltage across capacitor 82 exceeds reference voltage $V_{10}$, current sink 46 maintains the GATE pin at ground. Since the gate of FET N2 is connected to the GATE pin, FET N2 is off and master signal $V_{MASTER}$, and thus slave output $V_{SLAVE}$, is at 0V. Once comparator 83 determines that the voltage across capacitor 82, and thus the voltage at the SDTMR pin to which capacitor 82 is coupled, exceeds reference voltage $V_{10}$, current source 36 is coupled to the GATE pin to drive the gate of series FET N2. This permits the master signal $V_{MASTER}$ and slave output $V_{SLAVE}$ to ramp up in their user-programmed relationship. Device 60 also may be configured to keep the FAULT pin low until the voltage at the SDTMR pin is below a certain reference voltage.

The SD pin is pulled low again by transistor N6 when comparator 44 determines that the voltage at the ON pin is less than reference voltage $V_3$ and comparator 84 determines that the voltage at the RAMP pin (and thus master signal $V_{MASTER}$) is less than reference voltage $V_{11}$. Satisfaction of both conditions ensures that master signal $V_{MASTER}$ has ramped down almost completely to 0V before the slave supply is shutdown.

When series transistor N2 is used to generate master signal $V_{MASTER}$, as shown in FIG. 5B, a voltage drop occurs across sense resistor 62 and FET N2, distorting master signal $V_{MASTER}$. To compensate for the voltage drop, switch 86 connects the REMOTE pin to the RAMP pin (and thus master signal $V_{MASTER}$) when comparator 48 determines that series FET N2 is fully enhanced as discussed previously. If the REMOTE pin is connected to SENSE pin 88 of master supply 33, the master supply servos the voltage at the REMOTE and RAMP pins at the desired output voltage, thereby compensating for the undesirable voltage drop across sense resistor 62 and FET N2. SENSE pin 88 of master supply 33 is the node that power supply 33 regulates to its nominal output voltage.

When series transistor N2 is not used to generate master signal $V_{MASTER}$, the GATE and RAMP pins may be tied together to ramp capacitor 34 as illustrated in FIG. 5C and discussed in greater detail hereinabove with respect to FIG. 4. One of ordinary skill in the art will recognize that any one or more of the additional features described with respect to tracking or sequencing device 60 of FIGS. 5A-5C may be implemented in tracking or sequencing device 30 of FIG. 4.

Figure 6:
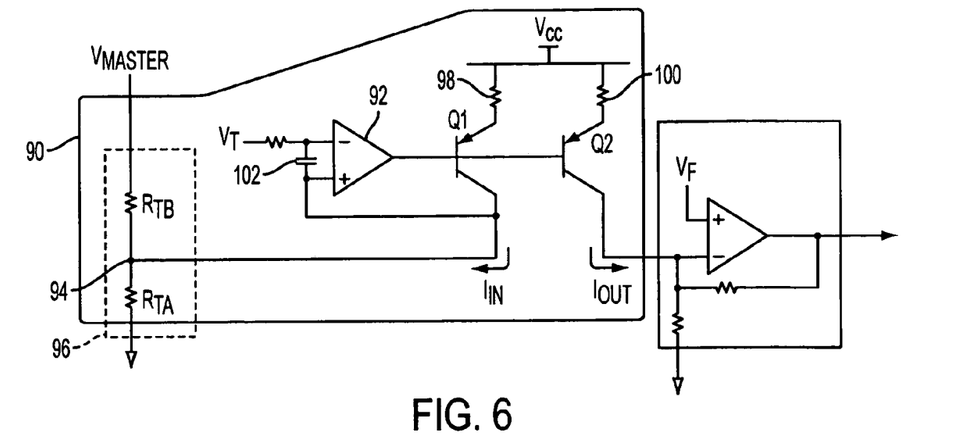
FIG. 6 is a second embodiment of the present invention for tracking or sequencing master and slave signals.

Referring now to FIG. 6, a second embodiment of the present invention for tracking or sequencing master and slave signals is described. Similar to the tracking or sequencing circuit described above with respect to FIGS. 3-5, tracking or sequencing circuit 90 also comprises high gain op amp 92 having a feedback loop that servos the voltage at tracking input terminal 94, which is interposed between resistors $R_{TA}$ and $R_{TB}$ of voltage divider 96, at reference voltage $V_T$. Node 94 is connected to the collector of transistor Q1, which along with transistor Q2 and op amp 92, comprises a current mirror that supplies as much input current $I_{IN}$ as necessary to maintain node 94 at voltage $V_T$. In servoing node 94 at reference voltage $V_T$, OP amp 92, which is integral to the current mirror formed by transistors Q1 and Q2, outputs a signal that is delivered to the bases of transistors Q1 and Q2, both of which have their emitters tied to supply voltage $V_{CC}$ via degeneration resistors 98 and 100. If the resistances of degeneration resistors 98 and 100 are equal, the current mirror formed by transistors Q1 and Q2 generates output current $I_{OUT}$ that is equal in magnitude to input current $I_{IN}$. However, if degeneration resistors 98 and 100 do not have equivalent resistances, output current $I_{OUT}$ will not have the same magnitude as input current $I_{IN}$. Capacitor 102 may be disposed across the inverting and non-inverting inputs of op amp 92 to provide compensation. Tracking or sequencing circuit 90 behaves similarly to the tracking or sequencing circuits of FIGS. 3-5.

Figure 7:
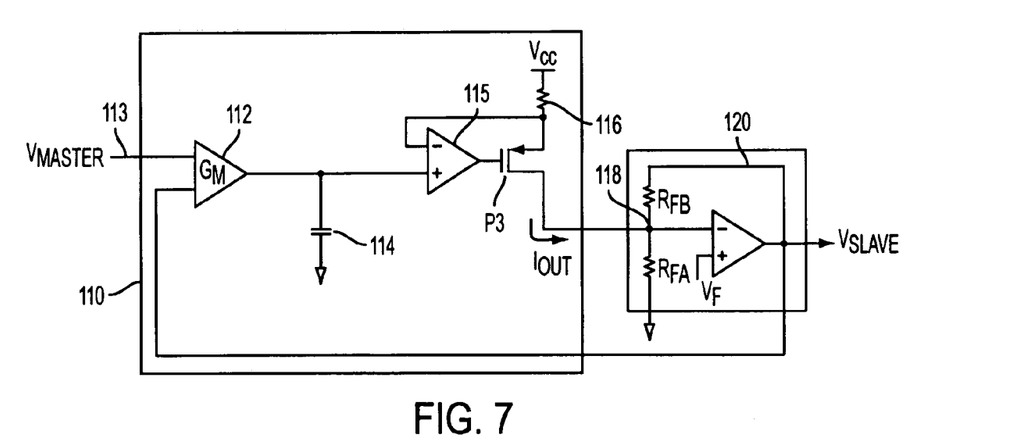
FIG. 7 is a schematic of a third embodiment of the present invention for tracking or sequencing master and slave signals.

Referring now to FIG. 7, a third embodiment of the tracking or sequencing circuit of the present invention is described. Tracking or sequencing circuit 110 comprises transconductance operational amplifier 112 that accepts master signal $V_{MASTER}$ from tracking input terminal 113 and slave output $V_{SLAVE}$, and operates to servo slave output $V_{SLAVE}$ at master signal $V_{MASTER}$. Gm amplifier 112 is configured to either sink or source current responsive to the difference between the master and slave signals.

More specifically, when slave output $V_{SLAVE}$ is less than master signal $V_{MASTER}$, gm amplifier 112 sources current to compensation capacitor 114 that forms a low pole to reduce interaction with the feedback network of slave supply 120. The current sourced by gm amplifier 112 charges the compensation capacitor, increasing the voltage at the output of gm amplifier 112 and at the non-inverting input of high gain op amp 115. Since a feedback network is coupled to the inverting input of op amp 115 and the source of transistor P3 is servoed at the voltage at the output of gm amplifier 112, an increase in that voltage raises the voltage at the source of transistor P3. This reduces the voltage drop across resistor 116 coupled between the source of transistor P3 and supply voltage $V_{CC}$, reducing output current $I_{OUT}$ injected into feedback terminal 118 of slave supply 120. This in turn drives slave output $V_{SLAVE}$ higher. Similarly, when slave output $V_{SLAVE}$ is greater than master signal $V_{MASTER}$, gm amplifier 112 sinks current from compensation capacitor 114 and drives slave output $V_{SLAVE}$ lower.

Figure 8:
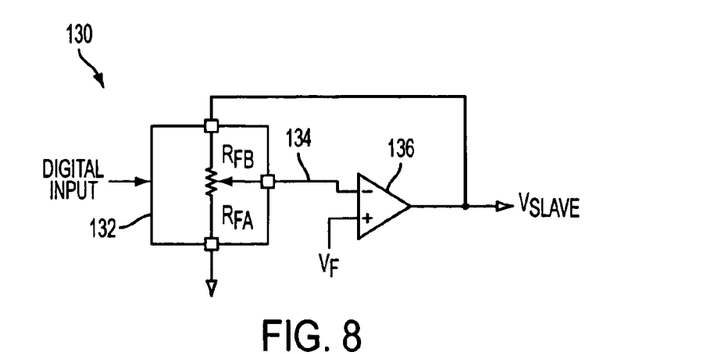
FIG. 8 is a block diagram of a fourth embodiment of the present invention for tracking or sequencing master and slave signals using digital control.

Referring now to FIG. 8, a fourth embodiment of the present invention is described. Circuit 130 comprises digitally controlled potentiometer 132 coupled to feedback node 134 of amplifier 136 of the slave power supply. Potentiometer 132 accepts digital input indicative of a master signal from a digital to analog converter (DAC) to dynamically alter the resistance of resistors $R_{FA}$ and $R_{FB}$. This changes the resistance of the feedback network presented to feedback node 134, thereby modifying slave output $V_{SLAVE}$ responsive to the master signal.

Although illustrative embodiments of the present invention are described above, one skilled in the art will recognize that various changes and modifications may be made with minor design modifications without departing from the invention. For example, any of the MOSFETs may be replaced with other types of transistors, such as bipolar junction transistors or insulated gate bipolar transistors. In addition, all PMOSs may be replaced with NMOSs and vice versa. Furthermore, while the above-described embodiments employ user-programmable components, such as resistors $R_{TA}$ and $R_{TB}$ and timing and ramping capacitors, those components also may be non-user-programmable.

All values, including, but not limited to, voltages, currents, and mirror ratios, provided in the above description are for illustrative purposes only. Different values may be used without departing from the scope of the invention. All reference voltages may comprise the same threshold levels or one or more different levels, and may be constant or variable in nature. Moreover, while FIGS. 2A-2D illustrate ramp rates of master signal $V_{MASTER}$ and slave output $V_{SLAVE}$ that do not change with time, as used herein, the term "ramp rate" includes ramp rates that are fixed or variable with time. A time variable ramp rate may produce waveforms having arbitrary shapes. Accordingly, the present invention controls slave output $V_{SLAVE}$ to track master signal $V_{MASTER}$ even when the master signal comprises an arbitrary waveform.

It is intended in the appended claims to cover all such changes and modifications that fall within the true spirit and scope of the invention.

What is claimed is:

1. A circuit for controlling an output of a slave supply in a defined relationship to a time-varying master signal, the slave supply having a slave output terminal and a feedback input terminal, the circuit comprising:
    a charging circuit for supplying a drive signal to a ramp generator circuit configured to generate the master signal, the charging circuit having first and second current sources for selectably sourcing current to or sinking current from the ramp generator circuit;
    a tracking input terminal for receiving a tracking signal responsive to the master signal;
    a circuit output terminal;
    an operational amplifier that is coupled to the tracking input terminal and that accepts an input signal and a reference signal and outputs an op amp output signal; and
    a third current source coupled to the circuit output terminal that generates output current responsive to the op amp output signal, the output current having a magnitude that forces the output of the slave supply to behave in the defined relationship to the master signal when the circuit output terminal is coupled to the feedback input terminal, and the coupling of the third current source to the circuit output terminal presenting a high impedance to the feedback input terminal.

2. The circuit of claim 1, wherein the reference signal is constant.

3. The circuit of claim 1, wherein the reference signal equals the output of the slave supply.

4. The circuit of claim 1, wherein the third current source is a current mirror.

5. The circuit of claim 4, wherein the operational amplifier is integral to the third current source.

6. The circuit of claim 1, wherein the defined relationship comprises one of the following relationships: coincident tracking, voltage offset tracking, ratiometric tracking, and supply sequencing.

7. The circuit of claim 1, wherein the third current source outputs current from the circuit output terminal.

8. The circuit of claim 1, wherein the defined relationship is user-programmable.

9. The circuit of claim 8, wherein the defined relationship is user-programmable by selection of at least one resistance value.

10. The circuit of claim 1, wherein the defined relationship is a function of a ramp rate of the master signal and a ramp rate of the output of the slave supply.

11. The circuit of claim 10, wherein the defined relationship is a function of a delay between onset of ramping of the master signal and onset of ramping of the output of the slave supply.

12. A method for controlling an output of a slave supply circuit in a defined relationship to a time-varying master signal, the slave supply circuit having a slave output terminal and a feedback input terminal, the method comprising:
    accepting the master signal at a master supply circuit, the master signal varying at a master ramp rate;
    generating current at the master supply circuit responsive to the master signal;
    injecting the generated current from the master supply circuit into the feedback input terminal of the slave supply circuit;
    forcing the output of the slave supply circuit to vary responsive to the master signal and in accordance with the defined relationship; and
    presenting a high impedance to the feedback input terminal of the slave supply circuit.

13. The method of claim 12, further comprising changing the ramp rate of the master signal with respect to time.

14. The method of claim 12, wherein forcing the output of the slave supply circuit to vary comprises forcing the output of the slave supply circuit to ramp at the same rate as the master ramp rate.

15. The method of claim 12, further comprising adding a time delay between onset of ramping the master signal and onset of ramping the output of the slave supply circuit.

16. The method of claim 12, further comprising user-programming the defined relationship.

17. The method of claim 16, wherein user-programming the defined relationship comprises selecting at least one resistance value.

18. The method of claim 12, further comprising generating the master signal.

19. A method for controlling an output of a power supply in a defined manner, the method comprising:
    providing a power supply with a feedback terminal, an output terminal and a feedback network coupled between the feedback terminal and the output terminal, the feedback network presenting a resistance between the output terminal and the feedback terminal;
    dynamically changing the resistance of the feedback network responsive to an input indicative of a master signal; and
    modifying the output of the power supply responsive to the dynamically changing resistance of the feedback network.

* * * * *